(12) United States Patent
Lee et al.

(10) Patent No.: US 7,680,870 B2
(45) Date of Patent: Mar. 16, 2010

(54) FFT APPARATUS FOR HIGH DATA RATE AND METHOD THEREOF

(75) Inventors: Jeong-sang Lee, Seoul (KR);
Sung-hyun Chung, Seongnam-si (KR);
Jae-min Ahn, Yongin-si (KR);
Min-joong Rim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1209 days.

(21) Appl. No.: 11/233,138

(22) Filed: Sep. 23, 2005

(65) Prior Publication Data
US 2006/0129620 A1 Jun. 15, 2006

(30) Foreign Application Priority Data
Dec. 14, 2004 (KR) .................. 10-2004-0105367

(51) Int. Cl.
G06F 17/14 (2006.01)
(52) U.S. Cl. ..................................... 708/404
(58) Field of Classification Search ................. 708/404, 708/408
See application file for complete search history.

(56) References Cited

U.S. PATENT DOCUMENTS

| | | | | |
|---|---|---|---|---|
| 6,098,088 A * | 8/2000 | He et al. | ....................... | 708/406 |
| 6,247,034 B1 * | 6/2001 | Nakai et al. | .................. | 708/409 |
| 6,792,441 B2 * | 9/2004 | Jaber | ........................... | 708/403 |
| 7,233,968 B2 * | 6/2007 | Kang | ........................... | 708/404 |
| 2004/0059766 A1 * | 3/2004 | Yeh | .............................. | 708/406 |

* cited by examiner

*Primary Examiner*—Chuong D Ngo
(74) *Attorney, Agent, or Firm*—Sughrue Mion, PLLC

(57) ABSTRACT

An FFT apparatus for quickly processing input signals and method thereof is disclosed. In performing the FFT for processing N input signals, four N/4-point FFT units implemented by radix-2 single-path delay feedback (R2SDF) units performs the FFT with respect to the input signals, and a radix-4 computation unit performs a radix-4 computation with respect to the signals transferred from the N/4-point FFT units. Accordingly, the input signals are processed in parallel through the N/4-point FFT units, and thus a quick process of the input signals can be performed.

9 Claims, 4 Drawing Sheets

FFT APPARATUS FOR HIGH DATA RATE AND METHOD THEREOF

This application claims benefit under 35 U.S.C. § 119 from Korean Patent Application No. 2004-105367, filed on Dec. 14, 2004, the entire content of which is incorporated herein by reference.

BACKGROUND OF THE INVENTION

1. Field of the Invention

The present invention relates to the FFT (Fast Fourier Transform) used in an OFDM (Orthogonal Frequency Division Multiplexing) system, and more particularly to an FFT method for processing input signals in parallel in order to quickly process the input signals.

2. Description of the Related Art

The basic principle of the OFDM (Orthogonal Frequency Division Multiplexing) system is to convert input data having a high data rate into parallel data which have a low data rate, where the number of parallel data is equal to the number of sub-carriers, and to carry the parallel data on the sub-carriers, respectively, to transmit the data in parallel. The OFDM can reduce relative distortions in the time domain by a multi-path delay spread since the symbol duration of the sub-carrier having the low data rate is increased, and can remove an inter-symbol interference by inserting a protection section that is longer than the delay spread of the channel between OFDM symbols.

Since the OFDM modulation/demodulation is performed using a plurality of sub-carriers, it is quite difficult to work out its hardware design as the number of sub-carriers is increased. Also, due to the difficulty in keeping the orthogonality between the sub-carriers, it becomes difficult to actually implement the system. Although this problem can be solved by adopting a DFT (Discrete Fourier Transform), the DFT has a drawback in that it requires a large amount of computation. In order to reduce the large amount of computation that is the drawback of the DFT, an FFT (Fast Fourier Transform) has been proposed. Specifically, in the OFDM system, an N-point DFT is required. However, as N increases, the amount of DFT computation also increases in proportion to $N^2$. Accordingly, it is required to provide an algorithm that can efficiently compute the DFT even if N is large. The FFT is an algorithm that remarkably reduces the amount of DFT computation by successively dividing a sequence having a length of N into sequences having a length shorter than N.

The FFT of the OFDM performs a computation of a complex number that is composed of a real part and an imaginary part. Accordingly, the real part and the imaginary part are separately inputted by hardware, and in designing a processor that performs the FFT, an inverse FFT (IFFT) can be performed by changing the positions of the real part and the imaginary part with each other. The FFT may be implemented in an array type or in a pipeline type. The array FFT structure is very complicated and enlarged by hardware, and thus its implementation is almost impossible if the number of FFT computation points is large. By contrast, the pipeline FFT structure is regular, is relatively easy to control and makes a serial input/output possible, and thus it is most frequently used in application fields that require a high performance.

Hereinafter, the DFT and the FFT will be explained in order. Signals having a predetermined period which are expressed by the DFT are defined by Equation (1):

$$X(k) = \sum_{n=0}^{N-1} x(n) e^{j\frac{2\pi}{N}nk} \quad (1)$$

wherein N denotes the number of signals, k denotes 0 to N−1, x(n) denotes an input signal and X(k) denotes an output signal. As described in Equation (1), the amount of DFT computation is increased as the value of N is increased.

FIG. 1 is a view exemplifying a process of performing a conventional FFT. Hereinafter, an algorithm that performs the conventional FFT will be explained in detail with reference to FIG. 1.

In particular, FIG. 1 describes a case in which the point (N) of the FFT is 16. Signals inputted to the FFT are x[0] to x[15]. Hereinafter, for the convenience in explanation, horizontal lines from x[n] to X[n] are called computation lines. Referring to FIG. 1, the FFT is composed of first to 16th computation lines. x[0] is divided at point a and transferred to the first computation line and the ninth computation line at point b. x[1] is divided at the point a and transferred to the second computation line and the tenth computation line at the point b. x[14] is divided at the point a and transferred to the seventh computation line and the 15th computation line at the point b. x[15] is divided at the point a and transferred to the eighth computation line and the 16th computation line at the point b.

The first to eighth computation lines at the point b add the transferred signals and output the added signals, and the ninth to 16th computation lines at the point b subtract the transferred signals and output the subtracted signals. The signals outputted from the point b are transferred to point c. The computation lines at the point c perform the same operations as the computation lines at the point a.

The first to fourth computation lines and the ninth to 12th computation lines at point d add the transferred signals and output the added signals, and the fifth to eighth computation lines and the 13th to 16th computation lines at the point d subtract the transferred signals and output the subtracted signals. The signals outputted from the point d are transferred to point e. The computation lines at the point e perform the same operations as the computation lines at the point a. The first to second computation lines, the fifth to sixth computation lines, the ninth to tenth computation lines and the 13th to 14th computation lines at point f add the transferred signals and output the added signals. The third to fourth computation lines, the seventh to eighth computation lines, the 11th to 12th computation lines and the 15th to 16th computation lines at the point f subtract the transferred signals and output the subtracted signals. The signals outputted from the point d are transferred to the point e.

The signals outputted from the point f are transferred to point g. The computation lines at the point g perform the same operations as the computation lines at the point a. The odd-numbered computation lines at point h add the transferred signals and output the added signals, and the even-numbered computation lines at the point h subtract the transferred signals and output the subtracted signals. Through the above-described process, the FFT is performed with respect to the input signals.

However, the FFT has the problems in that as the computation points N are increased, it takes a lot of time to process the input signals. This is because the FFT as illustrated in FIG. 1 does not process all the signals in parallel, but processes only a part of the signals in parallel. Accordingly, the necessity of an FFT that can quickly process the input signals is on the rise.

SUMMARY OF THE INVENTION

The present invention has been developed in order to address the above drawbacks and other problems associated with the conventional arrangement.

An aspect of the present invention is to provide an FFT apparatus and method which can process input signals in parallel.

The foregoing and other objects and advantages are substantially realized by providing an FFT apparatus for processing N input signals, according to an embodiment of the present invention, which comprises four N/4-point FFT units, implemented by radix-2 single-path delay feedback (R2SDF) units, for performing an FFT with respect to the input signals, and a radix-4 computation unit for performing a radix-4 computation with respect to the signals transferred from the N/4-point FFT units.

In another aspect of the present invention, there is provided an FFT method for processing N input signals, which comprises the steps of dividing the input signals into four groups and performing an N/4-point FFT that is implemented by radix-2 single-path delay feedback (R2SDF) units with respect to the signals included in the respective divided groups, and performing a radix-4 computation with respect to the N/4-FFT-transformed signals.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

Figure 1:
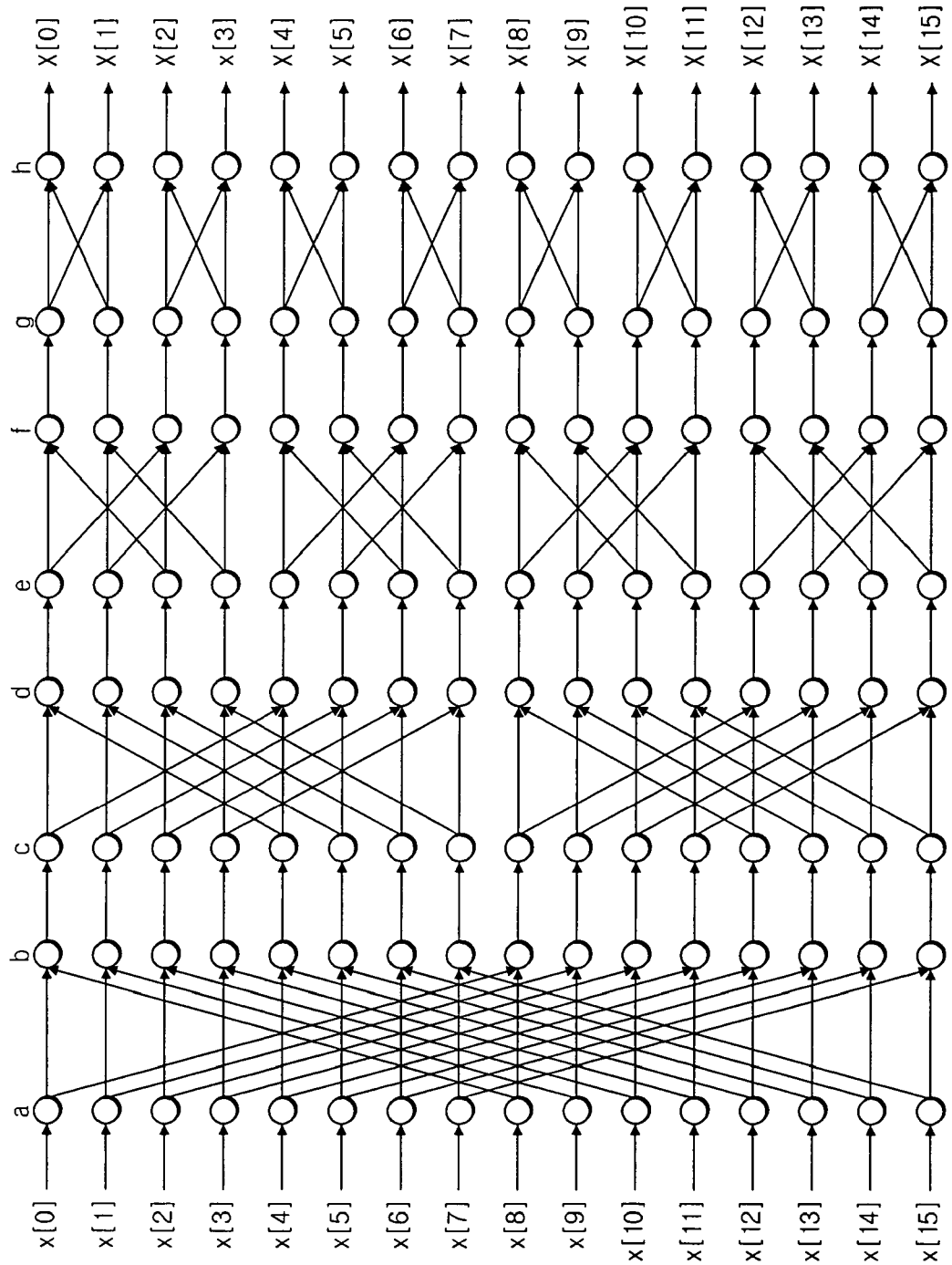
FIG. 1 is a view illustrating the structure of a conventional FFT apparatus.

Certain embodiments of the present invention will be described in greater detail with reference to the accompanying drawings.

In the following description, the same drawing reference numerals are used for the same elements even in different drawings. Certain material defined in the description, such as details of construction and elements, are only provided to assist in a comprehensive understanding of the invention. Thus, it is apparent that the present invention can be carried out without the defined material. Also, well-known functions or constructions are not described in detail since such description would obscure the invention in unnecessary detail.

Hereinafter, the scheme for implementing an FFT (Fast Fourier Transform) that can quickly process input signals according to an embodiment of the present invention will be explained.

Equation (1) as described above can be expressed by Equation (2).

$$D(k) = \sum_{n=0}^{\frac{N}{4}-1} d(4n)e^{-j\frac{2\pi}{N}4nk} + \sum_{n=0}^{\frac{N}{4}-1} d(4n+1)e^{-j\frac{2\pi}{N}(4n+1)k} + \qquad (2)$$

$$\sum_{n=0}^{\frac{N}{4}-1} d(4n+2)e^{-j\frac{2\pi}{N}(4n+2)k} + \sum_{n=0}^{\frac{N}{4}-1} d(4n+3)e^{-j\frac{2\pi}{N}(4n+3)k} =$$

$$\sum_{n=0}^{\frac{N}{4}-1} d(4n)e^{-j\frac{2\pi}{N/4}nk} + e^{-j\frac{2\pi}{N}k}\sum_{n=0}^{\frac{N}{4}-1} d(4n+1)e^{-j\frac{2\pi}{N/4}nk} + e^{-j\frac{2\pi}{N}2k}$$

$$\sum_{n=0}^{\frac{N}{4}-1} d(4n+2)e^{-j\frac{2\pi}{N/4}nk} + e^{-j\frac{2\pi}{N}3k}\sum_{n=0}^{\frac{N}{4}-1} d(4n+3)e^{-j\frac{2\pi}{N/4}nk} =$$

$$D_{(0)}(m) + e^{-j\frac{2\pi}{N}k}D_1(m) + e^{-j\frac{2\pi}{N}2k}D_2(m) + e^{-j\frac{2\pi}{N}3k}D_3(m)$$

Signals D0($m$), D1($m$), D2($m$), D3($m$) in Equation (2) mean the m-th output signals of the respective N/4-point FFTs that are parallel process constituent elements. The N/4-point FFT will be explained later.

Hereinafter, the property of the FFT described in Equation (2) will be explained using Equation (3) to Equation (5). Equation (3) describes the case in which m is '0', and Equation (4) describes the case in which m is '1'. Equation (5) describes Equation (3) and Equation (4) as generalized equations.

$$D(0) = D_0(0) + D_1(0)e^{\left(-j\frac{2\pi}{N}0\right)} + D_2(0)e^{\left(-j\frac{2\pi}{N}0\cdot2\right)} + D_3(0)e^{\left(-j\frac{2\pi}{N}0\cdot3\right)} \qquad (3)$$

$$D\left(\frac{N}{4}\right) =$$

$$D_0(0) + D_1(0)e^{\left(-j\frac{2\pi}{N}\cdot\frac{N}{4}\right)} + D_2(0)e^{\left(-j\frac{2\pi}{N}2\cdot\frac{N}{4}\right)} + D_3(0)e^{\left(-j\frac{2\pi}{N}3\cdot\frac{N}{4}\right)}$$

$$D\left(\frac{N}{2}\right) = D_0(0) + D_1(0)e^{\left(-j\frac{2\pi}{N}\cdot\frac{N}{2}\right)} + D_2(0)e^{\left(-j\frac{2\pi}{N}2\cdot\frac{N}{2}\right)} + D_3(0)e^{\left(-j\frac{2\pi}{N}3\cdot\frac{N}{2}\right)}$$

$$D\left(\frac{3N}{4}\right) =$$

$$D_0(0) + D_1(0)e^{\left(-j\frac{2\pi}{N}\cdot\frac{3N}{4}\right)} + D_2(0)e^{\left(-j\frac{2\pi}{N}2\cdot\frac{3N}{4}\right)} + D_3(0)e^{\left(-j\frac{2\pi}{N}3\cdot\frac{3N}{4}\right)}$$

$$D(1) = D_0(1) + D_1(1)e^{\left(-j\frac{2\pi}{N}1\right)} + D_2(1)e^{\left(-j\frac{2\pi}{N}2\right)} + D_3(1)e^{\left(-j\frac{2\pi}{N}3\right)} \qquad (4)$$

$$D\left(\frac{N}{4}+1\right) = D_0(1) + D_1(1)e^{\left(-j\frac{2\pi}{N}\left(\frac{N}{4}+1\right)\right)} +$$

$$D_2(1)e^{\left(-j\frac{2\pi}{N}2\cdot\left(\frac{N}{4}+1\right)\right)} + D_3(1)e^{\left(-j\frac{2\pi}{N}3\cdot\left(\frac{N}{4}+1\right)\right)}$$

$$D\left(\frac{N}{2}+1\right) = D_0(1) + D_1(1)e^{\left(-j\frac{2\pi}{N}\left(\frac{N}{2}+1\right)\right)} +$$

$$D_2(1)e^{\left(-j\frac{2\pi}{N}2\cdot\left(\frac{N}{2}+1\right)\right)} + D_3(1)e^{\left(-j\frac{2\pi}{N}3\cdot\left(\frac{N}{2}+1\right)\right)}$$

$$D\left(\frac{3N}{4}+1\right) = D_0(1) + D_1(1)e^{\left(-j\frac{2\pi}{N}\left(\frac{3N}{4}+1\right)\right)} +$$

$$D_2(1)e^{\left(-j\frac{2\pi}{N}2\cdot\left(\frac{3N}{4}+1\right)\right)} + D_3(1)e^{\left(-j\frac{2\pi}{N}3\cdot\left(\frac{3N}{4}+1\right)\right)}$$

-continued $$D(m) = D_0(m) + D_1(m)e^{(-j\frac{2\pi}{N}1\cdot m)} + D_2(m)e^{(-j\frac{2\pi}{N}2\cdot m)} + D_3(m)e^{(-j\frac{2\pi}{N}3\cdot m)} \quad (5)$$

$$D\left(\frac{N}{4}+m\right) = D_0(m) + D_1(m)e^{(-j\frac{2\pi}{N}(\frac{N}{4}+m))} +$$
$$D_2(m)e^{(-j\frac{2\pi}{N}2\cdot(\frac{N}{4}+m))} + D_3(m)e^{(-j\frac{2\pi}{N}3\cdot(\frac{N}{4}+m))}$$

$$D\left(\frac{N}{2}+m\right) = D_0(1) + D_1(m)e^{(-j\frac{2\pi}{N}(\frac{N}{2}+m))} +$$
$$D_2(m)e^{(-j\frac{2\pi}{N}2\cdot(\frac{N}{2}+m))} + D_3(m)e^{(-j\frac{2\pi}{N}3\cdot(\frac{N}{2}+m))}$$

$$D\left(\frac{3N}{4}+m\right) = D_0(m) + D_1(m)e^{(-j\frac{2\pi}{N}(\frac{3N}{4}+m))} +$$
$$D_2(m)e^{(-j\frac{2\pi}{N}2\cdot(\frac{3N}{4}+m))} + D_3(m)e^{(-j\frac{2\pi}{N}3\cdot(\frac{3N}{4}+m))}$$

Signals $D0(m)$, $D1(m)$, $D2(m)$, $D3(m)$ are inputted to the radix-4 computation unit at one time point, and signals $$D(m), D\left(\frac{N}{2}+m\right), D\left(\frac{N}{2}+m\right), D\left(\frac{3N}{4}+m\right)$$

are outputted at one time point through a parallel processing procedure.

Additionally, if the signals $D0(m)$, $D1(m)$, $D2(m)$, $D3(m)$ are successively inputted to the radix-4 computation unit by increasing m, the radix-4 computation unit successively outputs signals $$D(m), D\left(\frac{N}{4}+m\right), D\left(\frac{N}{2}+m\right), D\left(\frac{3N}{4}+m\right).$$

In order to successively obtain the signals $$D(m), D\left(\frac{N}{4}+m\right)D\left(\frac{N}{2}+m\right), D\left(\frac{3N}{4}+m\right),$$

the N/4-point FFT is implemented by radix-2 single-path delay feedback (R2SDF) units.

Figure 2:
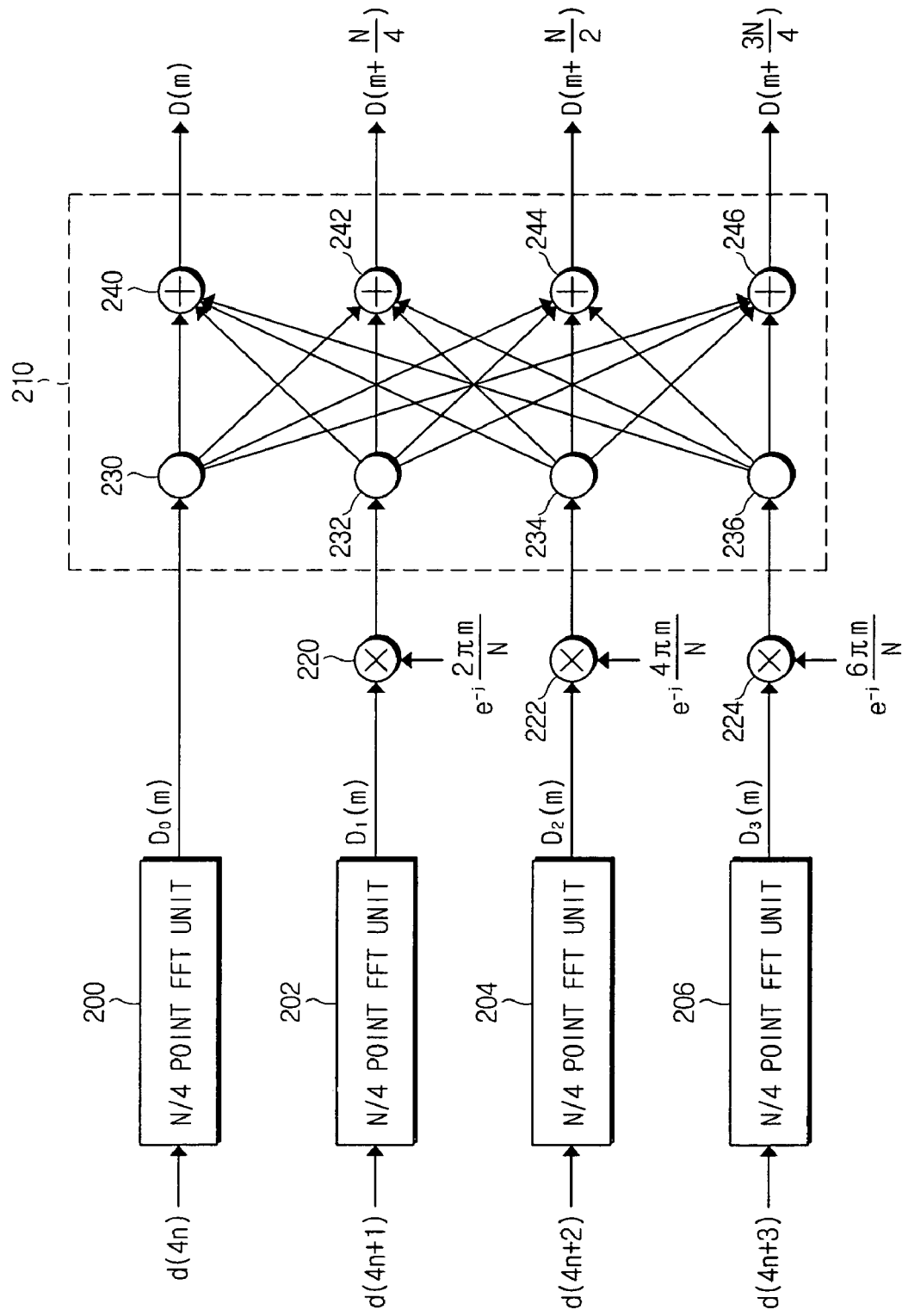
FIG. 2 is a view illustrating the structure of an FFT apparatus according to an embodiment of the present invention.

Hereinafter, the FFT according to an embodiment of the present invention will be explained with reference to FIG. 2. As illustrated in FIG. 2, the FFT is briefly composed of four N/4-point FFT units 200 to 206 and a radix-4 unit 210. The radix-4 unit is composed of four signal dividers 230 to 236 and four adders 240 to 246.

The N/4-point FFT unit 200 receives a signal d(4n), and the N/4-point FFT unit 202 receives a signal d(4n+1). The N/4-point FFT unit 204 receives a signal d(4n+2), and the N/4-point FFT unit 206 receives a signal d(4n+3). Table 1 below shows signals transferred to the N/4-point FFT units 200 to 206.

TABLE 1

| N/4-Point FFT(200) | N/4-Point FFT(202) | N/4-Point FFT(204) | N/4-Point FFT(206) |
|---|---|---|---|
| D(0) | d(1) | d(2) | d(3) |
| D(4) | d(5) | d(6) | d(7) |
| D(8) | d(9) | d(10) | d(11) |
| ... | ... | ... | ... |

The N/4-point FFT unit 200 successively receives signals d(0), d(4), d(8), . . . , and performs the corresponding operation. Then, the N/4-point FFT unit 200 successively outputs signals corresponding to D0(*m*) after performing the corresponding operation.

The N/4-point FFT unit 202 successively receives signals d(1), d(5), d(9), . . . , and performs the corresponding operation. Then, the N/4-point FFT unit 202 successively outputs signals corresponding to D1(*m*) after performing the corresponding operation. The N/4-point FFT unit 204 successively receives signals d(2), d(6), d(10), . . . . . , and performs the corresponding operation. Then, the N/4-point FFT unit 204 successively outputs signals corresponding to D2(*m*) after performing the corresponding operation. The N/4-point FFT unit 206 successively receives signals d(3), d(7), d(11), . . . , and performs the corresponding operation. Then, the N/4-point FFT unit 206 successively outputs signals corresponding to D3(*m*) after performing the corresponding operation.

The signals outputted from the N/4-point FFT units 200 to 206 are transferred to the radix-4 unit 210. As described in Equation (2), the signal outputted from the N/4-point FFT unit 202 is multiplied by $$e^{-j\frac{2\pi}{N}k},$$

and then transferred to the radix-4 unit 210. The signal outputted from the N/4-point FFT unit 204 is multiplied by $$e^{-j\frac{4\pi}{N}k},$$

and then transferred to the radix-4 unit 210. The signal outputted from the N/4-point FFT unit 206 is multiplied by $$e^{-j\frac{6\pi}{N}k},$$

and then transferred to the radix-4 unit 210.

Hereinafter, the operation performed by the radix-4 unit 210 will be explained. The signal dividers 230 to 236 transfer the received signals to the adders 240 to 246, respectively. The adders 240 to 246 add the transferred signals and output the added signals. The adder 240 successively outputs signals corresponding to D(m), and the adder 242 outputs signals corresponding to D(m(N/4)). The adder 244 successively outputs signals corresponding to D(m(N/2)), and the adder 246 outputs signals corresponding to D(m(3N/4)).

Figure 3:
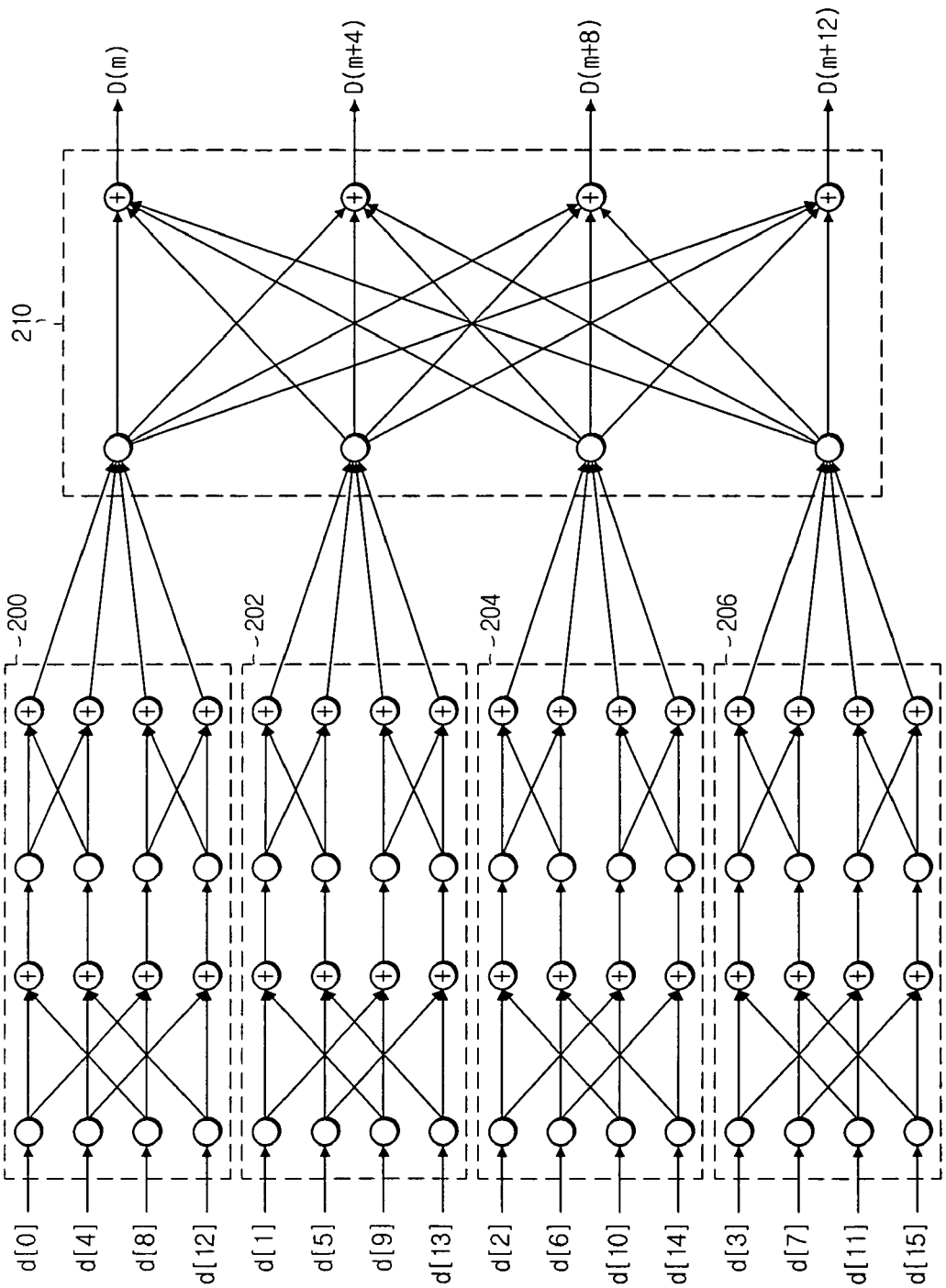
FIG. 3 is a view illustrating the structure of the FFT apparatus having 16 computation points according to an embodiment of the present invention.

FIG. 3 is a view illustrating the structure of the FFT apparatus in which N is 16 according to an embodiment of the present invention. The FFT apparatus receives signals d(0) to d(15). The signals d(0), d(4), d(8) and d(12) are transferred to the N/4-point FFT unit 200, and the signals d(1), d(5), d(9) and d(13) are transferred to the N/4-point FFT unit 202. The signals d(2), d(6), d(10) and d(14) are transferred to the N/4-point FFT unit 204, and the signals d(3), d(7), d(11) and d(15) are transferred to the N/4-point FFT unit 206. The operation of the N/4-point FFT units 200 to 206 will be explained with reference to FIG. 4. The N/4-point FFT units 200 to 206 transfer their output signals to the radix-4 unit 210. The operation performed by the radix-4 210 is the same as that as illustrated in FIG. 2.

Figure 4:
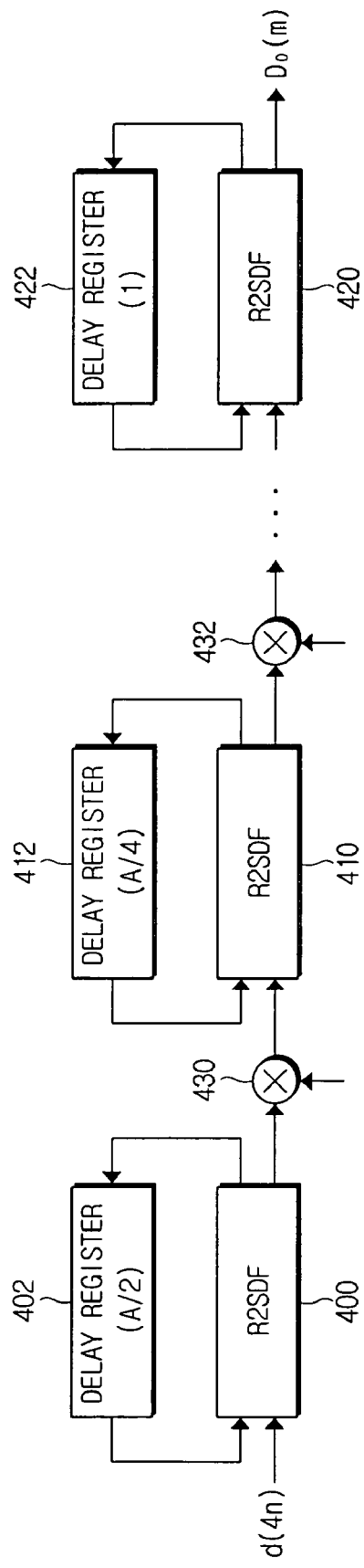
FIG. 4 is a view illustrating the structure of an N/4-point FFT according to an embodiment of the present invention.

FIG. 4 is a view illustrating the structure of the N/4-point FFT according to an embodiment of the present invention. Although FIG. 4 exemplifies the structure of the N/4-point FFT unit 200, the N/4-point FFT units 202 to 206 have the same structure. The N/4-point FFT unit 200 is composed of a plurality of R2SDF units 400, 410 and 420 and a plurality of corresponding delay registers 402, 412 and 422.

The R2SDF unit 400 successively receives A signals d(0), d(4), d(8), d(12), . . . The R2SDF unit 400 transfers the first received A/2 signals to the delay register 402. For example, if A is 8, the R2SDF unit 400 transfers the signals d(0), d(4), d(8) and d(12) to the delay register 402.

The R2SDF unit 400 creates a signal obtained by adding the signal d(0) transferred from the delay register 402 and the input signal d(16) and a signal obtained by subtracting the input signal d(16) from the transferred signal d(0). The R2SDF unit 400 creates a signal obtained by adding the signal d(4) transferred from the delay register 402 and the input signal d(20) and a signal obtained by subtracting the input signal d(20) from the transferred signal d(4). The R2SDF unit 400 creates a signal obtained by adding the signal d(8) transferred from the delay register 402 and the input signal d(24) and a signal obtained by subtracting the input signal d(24) from the transferred signal d(8). The R2SDF unit 400 creates a signal obtained by adding the signal d(12) transferred from the delay register 402 and the input signal d(28) and a signal obtained by subtracting the input signal d(28) from the transferred signal d(12).

The R2SDF unit 400 first outputs the added signals and then outputs the subtracted signals. That is, the R2SDF unit 400 successively outputs the signals d(0)+d(16), d(4)+d(20), d(8)+d(24), d(12)+d(28), d(0)−d(16), d(4)−d(20), d(8)−d(24) and d(12)−d(28).

The signals outputted from the R2SDF unit 400 are multiplied by a twiddle factor through a multiplier 430. The contents of the twiddle factor are not directly related to the present invention, and thus the detailed explanation thereof will be omitted.

The signals outputted from the multiplier 430 are successively transferred to the R2SDF unit 410. The R2SDF unit 410 transfers the first and second signals among the transferred signals to the delay register 412. The R2SDF unit 410 creates a signal obtained by adding the third signal d(8)+d(24) transferred from the multiplier 430 and the first signal d(0)+d(16) transferred from the delay register 412 and a signal obtained by subtracting the first signal d(0)+d(16) from the third signal d(8)+d(24). The R2SDF unit 410 creates a signal obtained by adding the fourth signal d(12)+d(28) transferred from the multiplier 430 and the second signal d(4)+d(20) transferred from the delay register 412 and a signal obtained by subtracting the second signal d(4)+d(20) from the fourth signal d(12)+d(28).

The R2SDF unit 410 first outputs the added signals among the created signals, and then outputs the subtracted signals.

The R2SDF unit 410 transfers the fifth and sixth signals among the transferred signals to the delay register 412. The R2SDF unit 410 creates a signal obtained by adding the seventh signal d(8)−d(24) transferred from the multiplier 430 and the fifth signal d(0)−d(16) transferred from the delay register 412 and a signal obtained by subtracting the fifth signal d(0)−d(16) from the seventh signal d(8)−d(24). The R2SDF unit 410 creates a signal obtained by adding the eighth signal d(12)−d(28) transferred from the multiplier 430 and the sixth signal d(4)−d(20) transferred from the delay register 412 and a signal obtained by subtracting the sixth signal d(4)−d(20) from the eighth signal d(12)−d(28).

The R2SDF unit 410 first outputs the added signals among the created signals, and then outputs the subtracted signals. Through the above-described process, the R2SDF unit 410 also outputs eight signals.

The signals outputted from the R2SDF unit 410 are multiplied by a twiddle factor through a multiplier 432. The operation performed by the R2SDF unit 420 is the same as that performed by the R2SDF unit 400 or the R2SDF unit 410, and the operation performed by the delay register 422 is also the same as that performed by the delay register 402 or the delay register 412. However, the signals transferred to the delay registers are different.

As illustrated in FIG. 4, the N/4-point FFT 200 successively outputs the signals the number of which is the same as that of the input signals.

If the N/4-point FFT units and the radix-4 according to the present invention as described above are used, an address of a memory in which the output signal is stored becomes different from an address of a memory in which the input signal is stored. Table 2 represents a memory in which the input signal is stored, and Table 3 represents a memory in which the output signal is stored.

TABLE 2

| Bank 0 | Bank 1 | Bank 2 | Bank 3 |
|--------|--------|--------|--------|
| 0      | 1      | 2      | 3      |
| 4      | 5      | 6      | 7      |
| 8      | 9      | 10     | 11     |
| ...    | ...    | ...    | ...    |
| N − 4  | N − 3  | N − 2  | N − 1  |

TABLE 3

| Bank 0 | Bank 1    | Bank 2    | Bank 3    |
|--------|-----------|-----------|-----------|
| 0      | 1         | 2         | 3         |
| N/2    | (N/2) + 1 | (N/2) + 2 | (N/2) + 3 |
| N/4    | (N/4) + 1 | (N/4) + 2 | (N/4) + 3 |
| ...    | ...       | ...       | ...       |
| N − 4  | N − 3     | N − 2     | N − 1     |

Since four N/4-point FFT units are used in the present invention, the memory is divided into four banks, i.e., bank 0 to bank 3. As described in Tables 2 and 3, the address of the memory in which the output data is stored is different from the address of the memory in which the input data is stored, and thus the existing method cannot be used to call the output data.

Figure 5:
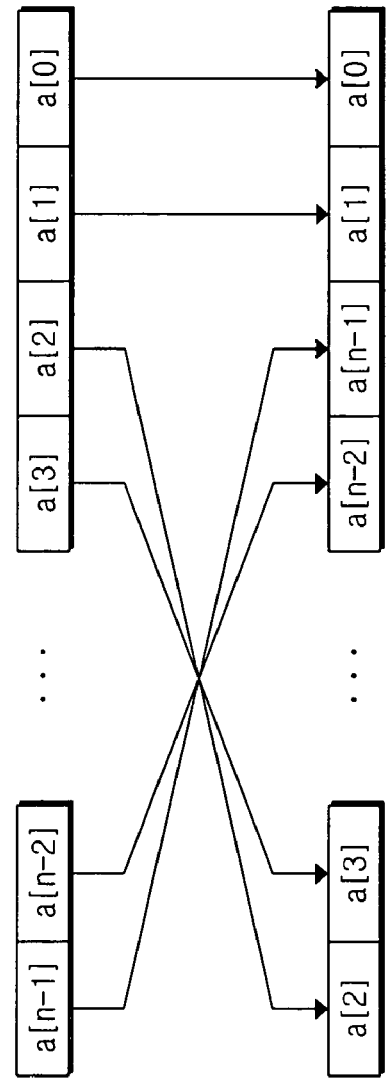
FIG. 5 is a conceptual view explaining a digit reverse process in the case of implementing the radix-4 computation structure according to the present invention.

FIG. 5 is a conceptual view explaining a digit reverse scheme for solving the problem occurring when the output data, for which the memory address is different from that of the input data, is called according to an embodiment of the present invention.

FIG. 5 illustrates the address of the output data to be called and the memory address. If it is intended to call the output data as illustrated in FIG. 5, the data is called from the address of the memory. Specifically, if the memory address of the data to be outputted is {a6 a5 a4 a3 a2 a1 a0}, the memory address to be actually called is {a2 a3 a4 a5 a6 a1 a0}. For example, if it is intended to call the data stored in the address '101010', the data stored in the memory address '010110' is called.

As described above, the present invention proposes a scheme for using a combination of N/4-point FFT units and a radix-4 unit in order to process the input signal in parallel. By using the N/4-point FFT units and the radix-4 unit as described above, the input signals can quickly be processed.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A fast Fourier transform (FFT) apparatus for processing N input signals, comprising:
    four N/4point FFT units, implemented by radix-2 single-path delay feedback (R2SDF) units, that perform an FFT with respect to the input signals, each of the four N/4-point FFT units configured to successively output signals generated by performing the FFT; and
    a radix-4 computation unit that performs a radix-4 computation with respect to the signals transferred from the N/4-point FFT units, the radix-4 computation unit including only one radix-4 butterfly.

2. The FFT apparatus as claimed in claim 1, wherein the FFT units receive d(4n), d(4n+1), d(4n+2) and d(4n+3) without repetition;
    wherein d(4n), d(4n+1), d(4n+2) and d(4n+3) are the input signals ($0 \leq n \leq \infty$).

3. The FFT apparatus as claimed in claim 1, further comprising a memory that dividedly stores the input signals as d(4n), d(4n+1), d(4n+2) and d(4n+3).

4. The FFT apparatus as claimed in claim 3, wherein if an address of the signal inputted to one of the N/4-point FFT units has M bits and is {a[M−1], a[M−2], . . . , a[3], a[2], a[1], a[0]}, an address of the signal outputted from the radix-4 computation unit having an index that is the same as an index of the input signal is {a[2], a[3], . . . , a[M−2], a[M−1], a[1], a[0]}.

5. The FFT apparatus as claimed in claim 1, wherein the N/4-point FFT units comprise delay registers which delay the signals transferred from the R2SDF units for a predetermined time and the number of the delay registers is equal to the number of R2SDF units.

6. A fast Fourier transform (FFT) method for processing N input signals, comprising:
    dividing the input signals into four groups and performing, by four N/4-point FFT units, an N/4-point FFT that is implemented by radix-2 single-path delay feedback (R2SDF) units with respect to the signals included in the respective divided groups, each of the four N/4-point FFT units configured to successively output signals generated by performing the N/4-point FFT; and
    performing, by a radix-4 computation unit including only one radix-4 butterfly, a radix-4 computation with respect to the N/4-FFT-transformed signals.

7. The FFT method as claimed in claim 6, wherein the respective group is composed of d(4n), d(4n+1), d(4n+2) and d(4n+3);
    wherein d(4n), d(4n+1), d(4n+2) and d(4n+3) are the input signals ($0 \leq n \leq \infty$).

8. The FFT method as claimed in claim 7, wherein the input signals are dividedly stored as d(4n), d(4n+1), d(4n+2) and d(4n+3), and the FFT is performed by outputting the stored signals.

9. The FFT method as claimed in claim 8, wherein if an address of the signal inputted to the one of the N/4-point FFT units has M bits and is {a[M−1], a[M−2], . . . , a[3], a[2], a[1], a[0]}, an address of the signal outputted from the radix-4 computation unit having an index that is the same as an index of the input signal is {a[2], a[3], . . . , a[M−2], a[M−1], a[1], a[0]}.

* * * * *